Dec. 20, 1960
B. KRAUSE
2,965,304
FOLDING BOOM RACE TRACK SPRINKLER
Filed March 3, 1958
2 Sheets-Sheet 1
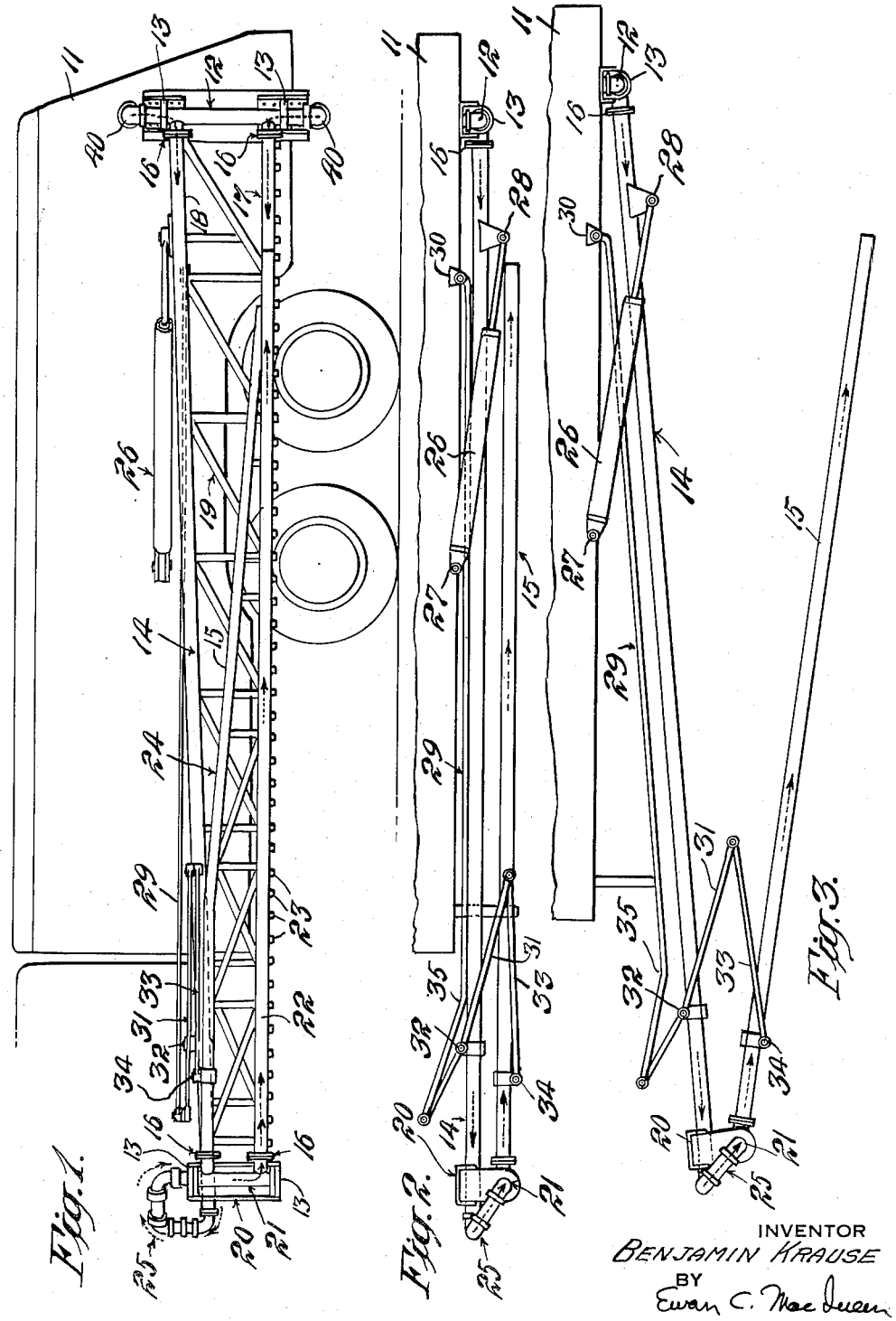
INVENTOR
BENJAMIN KRAUSE
BY
Ewan C. MacQueen
ATTORNEY Dec. 20, 1960 B. KRAUSE 2,965,304
FOLDING BOOM RACE TRACK SPRINKLER
Filed March 3, 1958 2 Sheets-Sheet 2

INVENTOR
BENJAMIN KRAUSE
BY
Ewan C. MacQueen
ATTORNEY

United States Patent Office 2,965,304
Patented Dec. 20, 1960

2,965,304

FOLDING BOOM RACE TRACK SPRINKLER

Benjamin Krause, Flushing, N.Y., assignor to The Heil Equipment Company of New York Incorporated, Long Island, N.Y., a corporation of New York Filed Mar. 3, 1958, Ser. No. 718,843

2 Claims. (Cl. 239—166)

The present invention is directed to a boom-type sprinkler particularly adapted for sprinking a racetrack, and, more particularly, to a folding-boom sprinkler adapted for mounting on a carrier such as a tank truck.

In the proper maintenance of a race track used for flat races, it is very important to maintain the track surface in proper condition so as to protect the feet of the race horses. Proper conditioning of the track surface requires continual tilling of the track and tempering of the surface with water. It is necessary to keep the track surface loose and to avoid dusting. The track surface, when it is in proper condition for racing, is sufficiently loose that a man walking across the surface will sink in up to his ankles. Because of the continual tilling required after each race to maintain the track surface in the required loose condition, sprinkling is required, particularly in dry weather, to keep the loose surface of the track in a properly tempered condition and to prevent dusting. In addition, dusting of the track surface is very undesirable to the proper conduct of racing. Usual watering of the racetrack has heretofore been conducted with the use of a tank truck having a fixed sprinkler boom connected to the tank and fixed to the back end of the truck. The boom extended only a short distance from each side of the tank truck and it was therefore necessary to use two trucks in parallel to cover the entire surface of the track and to sprinkle the track in the short time available between races. Because the loaded tank truck weighs about 20 tons, it was found that the truck tires sank deeply into the loose track surface and packed the same in a manner which was very detrimental to the proper conduct of racing on the track. It was accordingly necessary to follow each tank truck with a tractor-drawn harrow to till the track after passage of the truck to remove the truck tracks from the racing strip. However, the packing action of the heavy truck on the racing strip was so severe that it was not always removed from the track by the tilling action of the following harrow. It was therefore greatly desired to have a track sprinkler which would not pack the track, particularly in the track area near the inside rail, since it is this area in which almost all the horses run for the greater part of the race, particularly in flat races.

I have now developed a special boom-type sprinkler of particular value in sprinkling race tracks, and which is adaptable for mounting on automotive means, such as a tank truck. My new sprinkler enables the tank truck to travel on the outer edge of the track which is not used by flat-racing horses, and in addition, my new sprinkler makes it possible to sprinkle the entire width of the track at one pass, thus eliminating one of the previously required two tank trucks for sprinkling the entire width of the track. Since only one tractor is required to till the track after my special tank-mounted sprinkler has wet down the track, I afford another economic advantage in that one of the two previously required tractors is eliminated as well as the economic advantage that I afford a means for sprinkling the entire track surface with a single truck-mounted sprinkler.

It is an object of the present invention to provide a novel boom-type sprinkler adapted for mounting on a tank truck and capable of sprinkling the entire width of a race track in a single pass.

It is a further object of the present invention to provide a novel power-operated sprinkler boom which can be mounted upon a tank truck and can be completely controlled from the cab of the tank truck.

Another object of the present invention is to provide a novel boom-type sprinkler which can thoroughly saturate the entire surface of a racetrack in a single pass.

Still another object of the present invention is to provide a special boom-type sprinkler which carries the sprinkling water within its structural members.

It is also an object of the invention to provide a special hinge mounting for my boom-type sprinkler which provides for pivotal movement of the boom in a horizontal plane and also carries the water supply to the boom.

Still another object of the present invention is to provide a novel linkage for actuating the boom.

A still further object of my invention is to provide a power-actuated mounting for controllably adjusting the track clearance of my novel sprinkler boom.

Figure 1 depicts in elevation the novel folding boom sprinkler in retracted position as swingably mounted upon a tank truck.

Figure 2 depicts in plan view the novel folding boom sprinkler in retracted position mounted as in Figure 1.

Figure 3 depicts in plan view the novel folding boom sprinkler in partially extended position.

Figure 4:
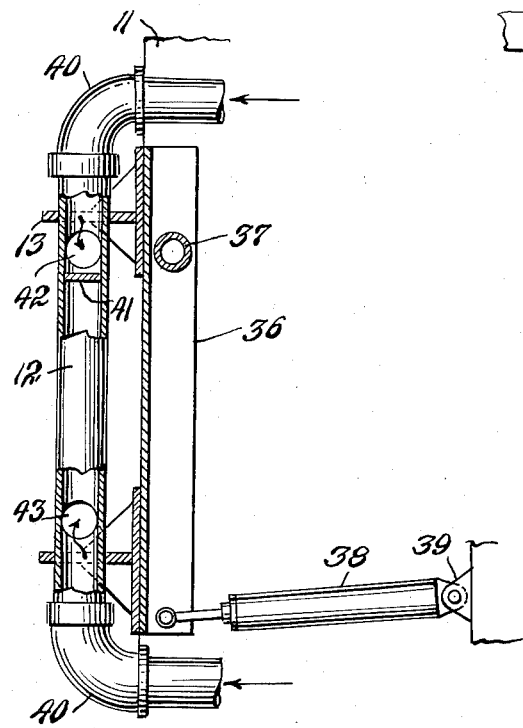
Figure 4 depicts the main hinge assembly for swingably mounting to an automotive carrier the novel folding boom sprinkler contemplated in accordance with the invention.

Generally speaking, the present invention is directed to a boom-type sprinkler adapted for mounting on a tank truck or other suitable automotive means, and comprising a sprinkler boom foldable intermediate its length and swingably mounted at one end, with both folding and swinging movements occurring in a horizontal plane.

Preferarbly, the sprinkler boom comprises two segments mounted in inboard and outboard relation to automotive carrier means, with the inboard segment swingably mounted upon the carrier at one end and being pivotally connected at the other end to the outboard segment. In the folded position, each boom segment lies parallel to the other and to the carrier vehicle, while in the unfolded position, the entire sprinkler boom is held at a position perpendicular to the carrier vehicle and preferably is swingably mounted upon hinge means connected to said vehicle at the rear thereof. The said hinge means preferably are mounted upon a vertical frame which is pivotally mounted intermediate its length upon said vehicle to permit control of the boom clearance from the track when the boom is in extended position.

The invention also contemplates power-operated means to control the folding, unfolding and swinging movements of the boom in a horizontal plane and to control the movement of the extended boom in a vertical plane.

Figures 1 and 2 of the drawing depict in elevation and plan views, respectively, the folding boom sprinkler contemplated in accordance with the invention in retracted position as mounted toward the rear of a tank truck indicated generally at 11. Swinging movement of the boom in a horizontal plane is provided by the main hinge assembly 12 having bearings 13 toward the ends thereof.

Hinge assembly 12 thus becomes the base of the folding boom. The folding boom, comprising inboard boom segment 14 and outboard boom segment 15, is mounted to the main hinge assembly 12 by means of flanges 16. Inboard boom segment 14 is generally in the form of an elongated and truncated A-frame comprising a lower hollow strut 17, provided with sprinkler heads 23 and an upper hollow strut 18 and may be provided with stiffeners 19. Inboard boom segment 14 terminates at its outboard end with hinge support 20 upon which is mounted hinge 21 which joins inboard boom segment 14 to outboard segment 15 and permits folding and unfolding of the boom in a horizontal plane at a point intermediate the length of the boom. Outboard boom segment 15 is likewise in the form of an elongated A-frame and itself comprises a hollow lower strut provided with sprinkler heads 23, an upper strut 24 and may be provided with stiffeners 19. Flanges 16 connect outboard boom segment 15 to hinge 21. Hinge 21 thus becomes the base of outboard boom segment 15. Hinge 21 is pivoted in bearings 13 which are mounted upon hinge support 20 and is slightly offset from the longitudinal axis of inboard boom segment 14 by the mounting on hinge support 20.

Both the main hinge assembly 12 and intermediate hinge assembly 21 are hollow and are adapted to carry water. In addition, the interior of main hinge 12 communicates with the interior of strut 17 and strut 18 of inboard boom segment 14. Water supplied to hollow lower strut 17 thus may be sprayed through sprinkler heads 23 therein. Hollow upper strut 18 carries water therealong through gooseneck connection 25, and through intermediate hinge 21 to the hollow lower strut 22 of outboard boom segment 15, from whence it is sprayed by means of sprinkler heads 23. In the foregoing manner, water is supplied to the folding boom sprinkler at a point intermediate its length and at a point near its mounting on the automotive carrier.

Figure 5:
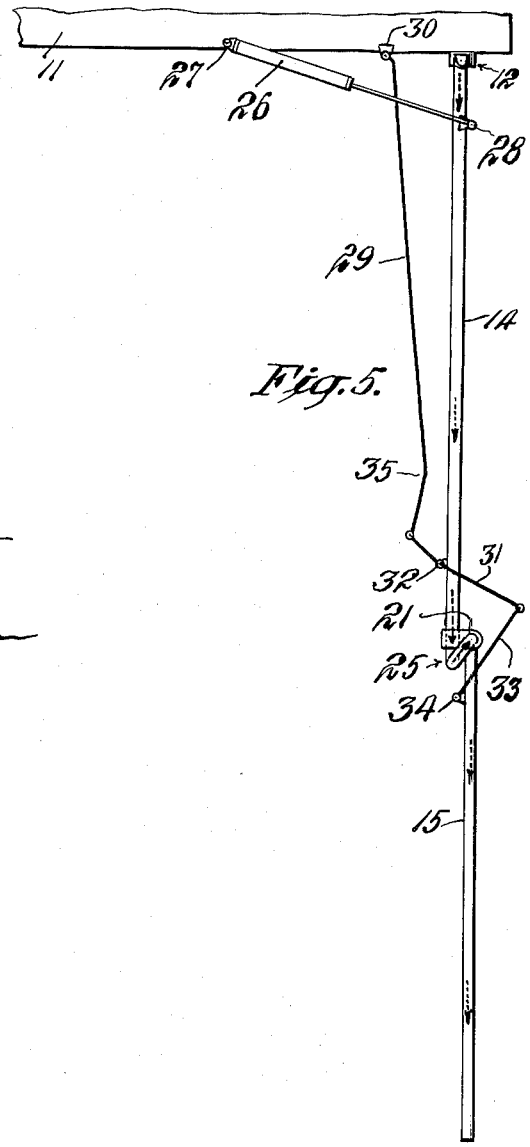
Figure 5 depicts the novel folding boom sprinkler contemplated in accordance with the present invention in plan view as fully extended.

In operation, it is desirable to control the folding, unfolding and swinging movements of the folding boom sprinkler by control means situated in the truck cab. For the sake of simplicity, it is also desirable to accomplish the unfolding of the boom, which requires a relative angular movement of 180° between the inboard boom segment 14 and outboard segment 15 simultaneously with the swinging of the boom, which requires an angular movement of 90° between inboard boom segment 14 and the truck body 11. This combined movement is depicted in Figures 2 and 3 which show, in plan view, the folding boom sprinkler in retracted and in partly extended position, respectively, and in Figure 5 which shows in plan view the folding boom sprinkler in fully extended position, drawn to a smaller scale. The combined movement is desirably accomplished by the combination of an air or hydraulic cylinder 26 pivotally connected to the truck body 11 at 27 and to inboard boom segment 14 near the base thereof at mounting 28, and a multiplying lever system connecting truck body 11 and both inboard boom segment 14 and outboard boom segment 15. The multiplying lever system comprises a long pull arm 29 pivotally mounted at 30 (see Figures 3 and 5) on truck 11 near main hinge 12, and connected pivotally to lever 31 (see Figures 3 and 5) which has a longer and a shorter lever arm and its fulcrum 32 mounted near the outboard end of strut 18 on inboard boom segment 14 and which lever 31 has its longer lever arm pivotally connected to push arm 33 which is, in turn, pivotally connected to outboard boom segment 15 at mounting 34. It will be noted that lever 31 is a lever of the first class having a shorter lever arm and a longer lever arm adapted to multiply by a factor of two the motion imparted therethrough to outboard boom segment 15 by push arm 33 as compared to the swinging motion imparted to inboard boom segment 14 by the action of cylinder 26. It is convenient to provide offsets as shown at 35 near the ends of pull arm 29 and lever 31 to provide a starting couple or force at all positions of extension and retraction of the folding sprinkler boom.

Figure 4 depicts, in elevation from the rear, main hinge assembly 12 mounted upon vertical frame 36 which is pivotally mounted intermediate its length about horizontal pivot 37 and is supported in adjustable relation in a vertical plane by cylinder 38 which is pivoted near the bottom of frame 36 and pivoted at its other end to the carrier truck frame at 39. Actuation of cylinder 38 permits movement of the extended boom in a vertical plane and thus controls the ground clearance of the extended boom. Vertical frame 36 may advantageously be constructed of a heavy channel and main hinge 12 as well as boom struts 17, 18 and 22 and intermediate hinge 21 may be constructed of heavy-walled tubing. Main hinge 12 is provided with upper and lower water supply means such as elbows 40 joined in water-tight relation to said hinge. Desirably, a water-tight closure 41 is fastened in the hollow interior of hinge 12 at a point intermediate the ports 42 and 43 which supply water to struts 17 and 18 by flanged connections 16. Water is supplied under pressure to elbows 40 by means of a pump, not shown. Closure 41 insures equal division of water to both inboard and outboard segments of the boom and prevents surging through the hollow interior of hinge 12.

It will be observed that intermediate hinge 21 is generally similar in construction to main hinge 12. Thus intermediate hinge 21, as well as main hinge 12, pivots in bearings 13 which may be thrust bearings of the cup-and-cone type or may be bushings, and is of generally hollow cylindrical configuration with water-tight swiveling connections at each end. It is necessary to provide only one port in hinge 21 which communicates with hollow strut 22 in outboard boom segment 15 and supplies water thereto.

It will be seen that the foregoing permits cab control of folding, unfolding and swinging of the boom and cab control of ground clearance of the extended boom since all movements of the boom are controlled by actuation of only two power cylinders.

It will be appreciated that in place of the multiplying lever system described hereinbefore to control unfolding and folding simultaneously with swinging of the boom, a sprocket-and-chain system arranged to provide a two-to-one multiplying ratio may be mounted adjacent the fold of the boom with the driving sprocket mounted upon hinge support 20 and with the driven sprocket arranged to apply power to hinge 21. An auxiliary power cylinder is employed to power the driven sprocket and the folding action of the boom is made either simultaneous with or independent from the swinging action of the boom when this embodiment is employed.

Although the present invention has been described in conjunction with preferred embodiments, it is to be understood that modifications and variations may be resorted to without departing from the spirit and scope of the invention, as those skilled in the art will readily understand. Such variations and modifications apparent to those skilled in the art are considered to be within the purview and scope of the invention and the appended claims.

I claim:

1. A sprinkler comprising a boom foldable intermediate its length and having inboard and outboard boom segments joined in hinged relation intermediate the length of said boom, said inboard boom segment being swingably mounted upon hinge means pivotally connected to a substantially vertical frame, said frame being pivotally mounted intermediate its length about a horizontal axis to a carrier, said boom being foldable and swingable in a horizontal plane through power-actuated means connecting said inboard boom segment to said carrier and connecting said inboard and said outboard boom segments and being adjustable in a vertical plane by rotation about said horizontal pivot, said inboard boom segment having hollow upper and lower struts and said outboard boom segment having a hollow lower strut, with said upper strut of said inboard boom segment being connected as a conduit to supply spray water to said outboard boom member and both of said lower struts being provided with spray heads, and said hinge means being provided with water supply means connected to said inboard boom segment of supply water to both inboard and outboard boom segments.

2. A carrier-mounted sprinkler comprising a boom foldable intermediate its length and having inboard and outboard boom segments joined in hinged relation intermediate the length of said boom, said inboard boom segment being swingably mounted upon hinge means connected to a substantially vertical frame, said vertical frame being mounted in horizontal pivoting relation to said carrier, said boom being foldable and swingable in a horizontal plane and being adjustable in a vertical plane by rotation about said horizontal pivot, said inboard boom segment having hollow upper and lower struts and said outboard boom segment having a hollow lower strut, with said upper strut of said inboard boom segment being connected as a conduit to supply spray water to said outboard boom segment and both of said lower struts being provided with spray heads, and said hinge means being provided with water supply means connected to said inboard boom segment to supply water to both inboard and outboard boom segments.

References Cited in the file of this patent

UNITED STATES PATENTS

| | | |
|---|---|---|
| 1,124,604 | Gailor | Jan. 12, 1915 |
| 1,293,534 | Perry | Feb. 4, 1919 |
| 2,098,523 | Simning | Nov. 9, 1937 |
| 2,539,288 | Van Horn | Jan. 23, 1951 |
| 2,565,587 | Boyett | Aug. 28, 1951 |
| 2,590,400 | Gollnick | Mar. 25, 1952 |

FOREIGN PATENTS

| | | |
|---|---|---|
| 144,264 | Sweden | Feb. 23, 1954 |
| 587,484 | Great Britain | Apr. 28, 1947 |